:::::::::::::::::::::::::::::::::::::::::::::::::::::::::::::::

3,431,772
METHOD AND APPARATUS FOR DETERMINING THE PERMEABILITY OF A MATERIAL
Stig Sunner, Sandby 17:10, 240 17 Sodra Sandby, and Kjell Rosengren, Mellanvangsvagen 6A, both of Lund, Sweden
Filed Aug. 8, 1966, Ser. No. 571,042
Claims priority, application Sweden, Aug. 13, 1965, 10,580/65
U.S. Cl. 73—38     8 Claims
Int. Cl. G01m 3/26

ABSTRACT OF THE DISCLOSURE

The permeability of a plastic foil is determined by establishing at least three chambers. One chamber is a reference-detector chamber and the other two chambers are a test-detector chamber and a test-gas chamber, the latter two being separated by a specimen of the foil. All three chambers are purged with a reference gas, and then the test-gas chamber is scavenged with the test gas which continuously flows therethrough during the test. In one embodiment, the reference-detector chamber is bordered by a metal foil; while in another embodiment, that latter chamber is spaced from a fourth chamber, which is filled with the test gas, by means of a foil identical to the first-mentioned foil.

---

Figure 1:
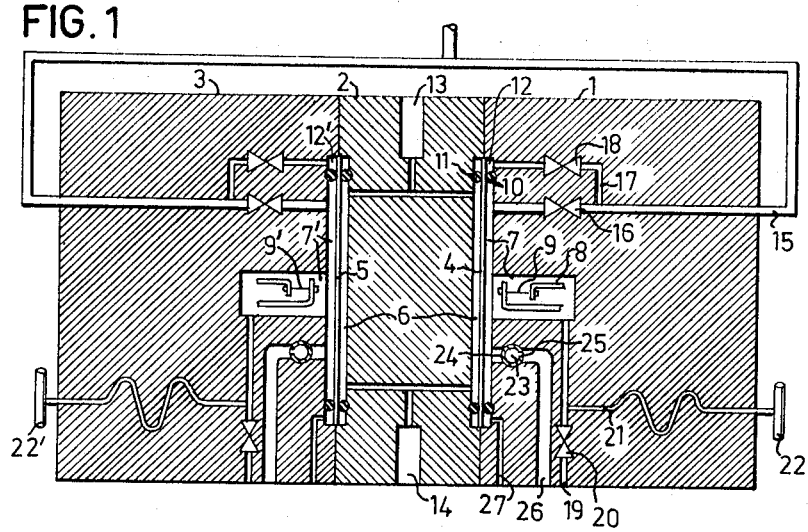

This invention relates to a method and an apparatus for determining the permeability of a material.

In the packaging art the imperviousness to gas of various materials is often of decisive importance. For instance, in packages for carbonated beverages the packaging material must be of a kind such that diffusion of carbon dioxide through the walls of the packages is prevented or at least maintained at a very low level. In view of the fact that it has been suggested of late to package carbonated beverages in containers of plastic material the need of plastics highly impervious to gas has become a question of current interest. Plastics are known which effectively satisfy the requirement as to imperviousness to carbon dioxide but which for economical or other reasons are not suited solely to form the walls of the packages. Therefore attempts have been made to produce laminates or mixtures of different plastics which not only are very impervious to carbon dioxide but also satisfy the requirements as to mechanical strength, workability and low cost. During this development work it has been found, however, that hitherto there exists no sattisfactory method of measuring the imperviousness to gas of the materials. As a matter of fact prior-art methods are too time-wasting and/or not sufficiently accurate.

The methods which are to be contemplated primarily for measuring the values in question can be divided into three groups, namely, manometric, volumetric and isostatic measuring methods which have the common feature that a test foil of the material the properties of which are to be examined is inserted between a test gas chamber and a detector chamber. The manometric method measures the pressure variations in the detector chamber which occur as the test gas diffuses through the test foil into this chamber. The volumetric method measures instead thereof changes of the volume of the detector chamber which in this case is expansible. The isostatic method to which the present invention relates makes use of a reference gas in the detector chamber. The diffusion of test gas through the test foil into the detector chamber results in a change of concentration in this chamber which change is sensed by a detector and is a measure of the amount of gas that diffuses through the foil and, consequently, a measure of the permeability to gas of the foil.

At least in the case of the isostatic measuring method it is desired to keep the volume of the detector chamber as small as possible because the accuracy of measurement as well as the time required for the measurement are both dependent to a high degree on the ratio of the area of the foil or diaphragm to said volume. However, there also occurs a diffusion of reference gas from the detector chamber into the test gas chamber, i.e., in the opposite direction. This diffusion interferes with the measuring operation. In order to reduce the effect of this diffusion on the accuracy of measurement, it has been necessary to increase the volume of the detector chamber resulting in an increase of the required measuring time. The compromise solution which, consequently, previously has been considered necessary but which cannot be accepted in cases where strict requirements as to accuracy of measurement and rapid measurement are made, is avoided by the method according to this invention which in its broadest aspect is characterized by the consecutive steps of scavenging both detector chambers and the side of the test foil remote from the test detector chamber with a reference gas until a stable condition is obtained in the apparatus, ending the scavenging of the detector chamber and scavenging said side of the test foil with test gas, whereby to bring about diffusion of test gas through the test foil into the test detector chamber and diffusion of reference gas through the test foil in the opposite direction, removing the reference gas by the scavenging test gas, and preventing pressure variations, if any, due to diffusion by placing at least the test detector chamber through a narrow connection in communication with a large gas volume.

Due to the provision of the narrow connection, for instance a capillary tube, between the detector chamber and the external gas volume which may be the surrounding atmosphere the following two conditions for an accurate measuring method are obtained:

(a) The gas diffusing into the detector chamber and the amount of which is to be determined will not result in an increase of pressure that would interfere with the measuring. In addition it is possible to give the apparatus a desired geometrical shape such that only very small amounts of gas will leave the detector chamber during the measuring operation.

(b) The diffusion in the opposite direction of reference gas from the detector chamber which normally would cause a reduction of pressure in the detector cell is compensated for by the external gas supply so as to maintain a constant pressure in the detector cell. By way of example the reference gas may be hydrogen gas or helium. The diffusion of these gases through the test diaphragm is considerably greater than the diffusion of the gas with respect to which the permeability of the diaphragm is to be examined. Consequently, the flow of gas through the capillary tube is directed toward the detector cell with the result that the loss of test gas is insignificant.

The detector elements are resistor elements, preferably thermistors the use of which in this connection is previously known. A thermistor consists of an electric resistor the resistance of which is highly dependent on the temperature. Consequently, if the composition of the gas surrounding the thermistor is changed the thermal conductivity of the gas mixture will simultaneously vary resulting in a change of the temperature and resistance of the current-carrying thermistor. The measurement is suitably in the form of a differential measuring method, such as by means of a bridge connection so as to compensate for external interference. A plurality of different methods may be used for calibrating the apparatus. According to one method the permeability of a foil is measured which previously has been measured in another apparatus. This method has obvious inconveniences, for instance because of the need of an additional measuring apparatus. According to another method the detector chambers are scavenged with a gas mixture of known composition, for instance one percent gas in the reference gas. In this case a difference of deflection is obtained between the one percent gas and the pure test gas. However, in order to evaluate this calibration the exact volume of the test thermistor chamber must be known. This volume is difficult to determine because it is directly dependent on an eventual bulging of the test foil. For this reason this calibrating method cannot be considered satisfactory.

Therefore the measurement result obtained is transformed into quanta of permeability in a manner not afflicted with the above named inconveniences by supplying an exactly known quantity of test gas or test gas mixture of known composition to the gas detector chamber so as to obtain a certain deflection of the measuring instrument which deflection is the basis of the calibration of the values obtained by the diffusion.

Figure 6:
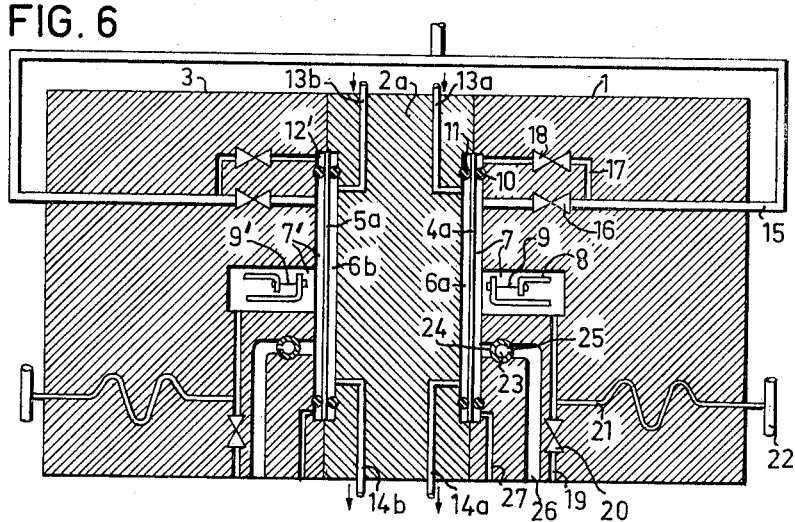
Figure 2:
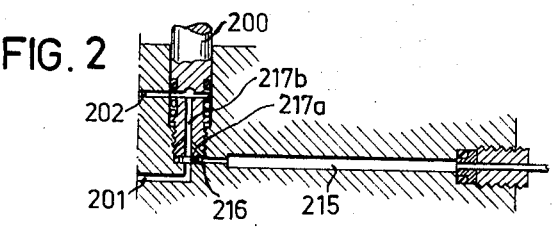
Figure 4:
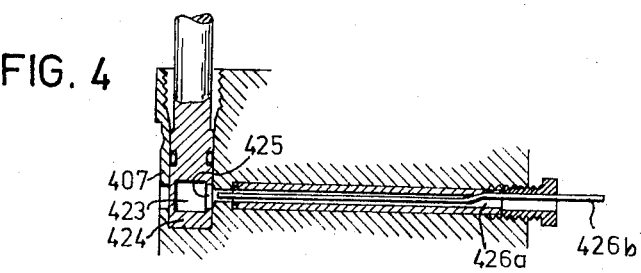
Figure 3:
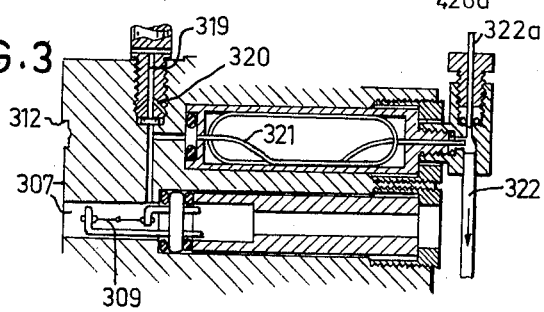
Figure 5:
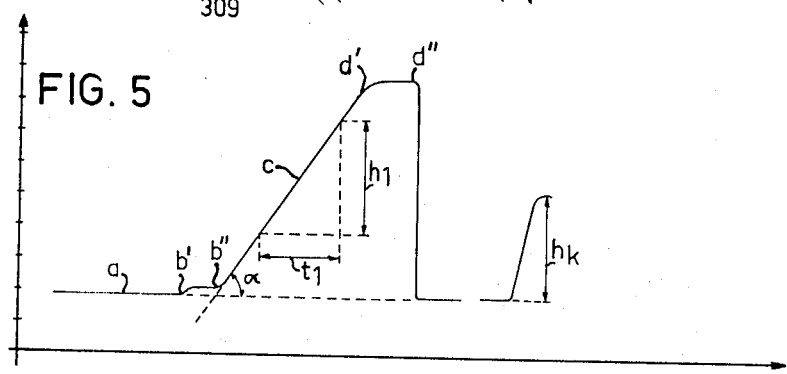

Two preferred embodiments of the invention will now be described with reference to the annexed drawings in which:

FIG. 1 is a diagrammatic sectional view of the first embodiment of the measuring apparatus, FIG. 2 is a sectional view of means for supplying gas to the detector spaces, FIG. 3 illustrates how the detector spaces even during the measuring operation via a capillary tube communicate with a larger gas volume, preferably the ambient atmosphere, FIG. 4 illustrates the calibration members, FIG. 5 illustrates curves from which the measurement result can be obtained, and FIG. 6 is a diagrammatic sectional view of a modified embodiment of the measuring apparatus according to the invention.

The apparatus illustrated in FIG. 1 comprises three main parts, namely, at test detector block 1, a test gas chamber block 2 and a reference detector block 3. For the sake of convenience the three blocks are termed hereinafter test block, central block and reference block, respectively.

Provided between the test block 1 and the central block 2 is a test foil 4 of the material the properties of permeability of which are to be tested.

Similarly, between the central block 2 and the reference block 3 there is provided a reference foil 5 which is impermeable to the test gas and may consist of a metallic diaphragm.

The sides of the central block 2 facing the test block 1 and the reference block 3, respectively, have recesses of comparatively small depths. These recesses communicate with each other and form a continuous space or chamber 6 for the test gas. The test gas chamber 6 has an inlet duct 13 and an outlet duct 14.

The two detector blocks 1 and 3 are exactly symmetrical with respect to the central block. Hereinbelow the test block 1 will be described more in detail. Most of the reference numerals referring to the reference block 3 are omitted for the sake of clarity and the remaining numerals for the reference block are the same as those employed for the corresponding details of the test block 1 and are provided with apostrophes (').

Similarly to the central block 2 the detector blocks 1 and 3 have comparatively shallow recesses. In addition they have deeper cavities 8 for the test thermistor 9 and the reference thermistor 9', respectively. The recesses and the deeper cavities for the thermistor form a test detector or thermistor chamber 7 and a reference detector or thermistor chamber 7'.

Reference numerals 10 and 11 denote O-rings which are in sealing contact with the test foil 4. The space outside the O-rings is indicated at 12.

The gas (test gas or reference gas) is supplied to the test detector chamber 7 through an inlet duct 15 provided with a valve 16. Numeral 17 denotes a branch duct communicating with the duct 15 and having a valve 18 which preferably cooperates with the valve 16 such that the valve 18 is closed when the valve 16 is open, and vice versa. An outlet duct from the space 12 is denoted at 27.

The test detector chamber 7 has a further outlet duct 19 which can be opened and closed by a valve 21. By means of a capillary tube 21 the detector chamber 7 communicates during the measuring operation with a larger gas volume through a tube 22 which is scavenged with reference gas. The velocity of the scavenging gas is very low so as to avoid any ejector effect.

Finally, FIG. 1 illustrates members for calibrating the measuring apparatus. Calibration is effected by a calibrating volume 23 defined by a chamber casing 24 which can be turned in the test block 1. The casing 24 has an opening 25 through which the casing can be filled with test gas through a duct 26. If the casing 24 is turned half a revolution the volume 23 will communicate with the detector chamber 7 and gas will diffuse from the chamber casing 24 into the detector chamber.

As mentioned above the reference block 3 is provided with members similar to the members of the test block 1. Therefore, it is not necessary to describe the reference block 3 in detail.

The entire apparatus is intended to be housed in an isothermal container or at least effectively insulated from the ambient atmosphere such that the external conditions are kept as constant as possible during the measuring operation. The thermistors are comprised in a measuring bridge and form two adjacent branches of the bridge. The other two branches of the bridge consist of standard resistors. A change of the current through the thermistors result in an unbalance of the bridge intended to be recorded by a writing instrument.

The mode of operation of the gas diffusion meter described is as follows. It is assumed that a test foil has been put in place in the apparatus and that the external conditions are stable. The test is started by scavenging both the detector chambers 7, 7' and the test gas chamber 6 with a reference gas, preferably He or $H_2$.

Then the scavenging of the thermistor chambers 7, 7' is brought to an end by closing the valves 16, 16' on the inlet side and the valves 20, 20' on the outlet side.

The detector chambers 7, 7' are still in communication with the ambient atmosphere via the capillary tubes 21, 21'. As a result both thermistors 9, 9' are maintained at the same constant pressure during all steps of operation. In order to prevent the surrounding atmosphere from diffusing into the detector chambers, the outer ends of the capillary tubes are scavenged with reference gas passing through the tubes 22, 22'. The flow velocity of the reference gas is very low to prevent an ejector effect.

After the valves on the inlet and outlet sides of the detector chambers have been closed the reference gas in the test chamber is replaced by the test gas. This exchange takes place rapidly and effectively because of the very small volume and the advantageous shape of the test gas chamber 6. Now there occurs a diffusion of test gas into the test detector chamber 7, which is the diffusion to be determined, as well as a diffusion of reference gas in the opposite direction. Due to the fact that the test gas chamber is all the time scavenged with test gas a pure test gas can be maintained in this chamber because of the removal of amounts of reference gas diffusing into the test gas chamber. Because of the fact that the reference gas which preferably consists of He or $H_2$ having very small molecules, diffuses faster than the test gas a negative pressure would soon prevail in the test detector chamber 7, this being prevented due to the communication of the detector chamber via the connection 21 with a large gas volume which maintains the pressure in the chamber at a constant value. According to a preferred embodiment of the invention this large gas volume is the surrounding atmosphere.

The diffusion of test gas into the test detector chamber 7 results in a change of the composition of the gas in the chamber whereas the composition of the gas contained in the reference detector chamber 7' is not changed because the reference diaphragm 5 is impermeable to the test gas. Consequently, a change of current occurs in the measuring bridge comprising the thermistors 9, 9', said change of current being recorded by a writing instrument.

FIG. 5 illustrates a curve which represents changes of current in the bridge depending on the composition of gas in the test detector chamber. The first part $a$ of the curve represents the first step of the test during which both the detector chambers and the test gas chamber are scavenged with reference gas. During this part of the test the test detector chamber contains the same sort of gas as the reference detector chamber. Consequently, no change of current caused by a change of the resistivity of one of the thermistors can occur. During this step the deflection is kept at a constant level as indicated by the first horizontal part $a$ of the curve.

At a time corresponding to the point $b'$ in the diagram scavenging of the thermistor chambers is ended by closing the valves 16 and 18. Scavenging of the test gas chamber with reference gas is continued to the point $b''$ of the curve at which time the reference gas is replaced by test gas.

If the line $b'–b''$ is horizontal there is obtained a guarantee that thermal balance is prevailing in the apparatus and that no gas is leaking into the detector chambers from the ambient atmosphere, such as through the capillary tube 21, the calibration device or past the O-rings 10.

As will be seen from the curve a more or less marked deflection may occur at the point $b'$. This deflection is a result of the test foil material's content of organic substances having a non-negligible vapour pressure and of permanent gases absorbed on the surface of the test material and dissolved in the material. However, due to the very small volume of the detector chambers there is rapidly obtained a saturation value illustrated by the continued horizontal course of the curve. This is of special importance in measuring very low permeabilities in which case the deflection at $b'$ can be relatively great.

During the continued test represented by the part $c$ of the curve test gas is passing through the test chamber whereas the test detector chamber and the reference detector chamber contain reference gas. Consequently, test gas will diffuse through the test foil into the test detector chamber. In the present embodiment of the measuring apparatus a corresponding diffusion into the reference detector chamber is prevented by the reference diaphragm which is made of a material impermeable to the test gas. According as more and more test gas diffuses into the test detector chamber the deflection of the measuring instrument is increased, and during this part of the test the curve is rectilineary ascending.

After the scavenging with test gas has proceeded for a certain time the test gas in the detector chambers is replaced by the reference gas. This time is indicated at $d'$ in the diagram. Thereafter the curve flattens as shown in the diagram. At the time $d''$ the test gas is replaced by reference gas in the detector chambers. The curve falls abruptly due to the very rapid exchange which is possible because of the small dimensions and suitable shape of the chambers. After the exchange of gases the curve is on the same level as at the beginning of the test.

The permeability to gas may be defined as the amount of gas which as per hour and square metre diffuses through the material in consideration. The area of the diaphragm is known and the time can be directly read from the diagram obtained. As to the amount of the diffused gas which may be expressed in litres there is only obtained a characteristic dimension, namely the deflection of the curve. To convert this deflection into a certain volume the apparatus has to be calibrated.

In order to calibrate the apparatus according to the invention so as to evaluate the measurement results obtained an exactly known volume of a gas mixture of known composition denoted at 23 in FIG. 1 is permitted to diffuse into and to fill the test detector chamber, and the resulting deflection is measured. In this case the added gas volume is exactly known and independent of bulges in the diaphragm.

The right-hand curve in FIG. 5 is a graphical illustration of the calibration. Due to the supply of a certain volume of test gas into the gas detector chamber there is obtained a deflection $h_k$ corresponding to a certain volume of test gas. A deflection $h_1$ can now directly be transformed into a certain gas volume that has diffused through the diagram.

The measurement result which is proportional to the inclination $\alpha$ of the curve $c$ can now directly be expressed by $h_1/t_1A$ wherein $h_1$ is a quantity of diffused gas in litres, $t_1$ is the corresponding time in hours and A is the area of the test diagram expressed in square metres.

FIGS. 2 to 4 illustrate in detail the construction of certain parts of the measuring apparatus. FIG. 2 illustrates the means for the supply of gas to the test detector chamber 7 and for scavenging the space 12 outside the O-rings 10 and 11, said means being denoted at 15–18 in FIG. 1. Numeral 215 denotes the gas supply conduit through which the gas can be admitted to the detector chamber via the duct 201. At the beginning of the measuring operation the screw 200 is screwed upwards so that reference gas can enter the detector chamber through the ducts 215, 201. The reference block 3 comprises of course members similar to those described in connection with the test block 1.

When the scavenging is to be interrupted the screw 200 is screwed downwards so that the packing 216 seals the connection between the ducts 215 and 201. Instead of connection 217a, 217b, 202 is opened so that reference gas can enter the space 12 (FIG. 1). During continued measuring operation the space 12 will be scavenged with reference gas to prevent gas from the surrounding atmosphere from leaking into the detector chambers which would spoil the measurement result. The same conditions apply to the space 12'.

FIG. 3 illustrates the construction of the important detail which constitutes the connection between the detector chamber and the ambient atmosphere. The details in FIG. 3 are indicated by the same reference numerals as the corresponding details of FIG. 1 with the addition of 300. In view of the above description of FIG. 1 an additional explanation of FIG. 3 is considered unnecessary. It should be noted however, that the tube 322 opens directly into the ambient atmosphere so that air is prevented from diffusing inwards through the capillary tube 321 the outer end of which is scavenged with reference gas. The conduit for the supply of reference gas for this purpose is denoted at 322a.

FIG. 4 illustrates a preferred embodiment of the calibrating means which comprise a chamber casing 424 having an opening 425 and defining a chamber 423 of exactly predetermined volume. If the casing 424 is turned half a revolution from the position shown in FIG. 4 the gas contained in the chamber can enter the detector chamber 407. The gas is supplied to the chamber 424 through a tube 426b located in a duct 426a. Due to the arrangement of the duct 426a and the tube 426b the chamber 423 will be rapidly and effectively filled with gas.

According to a modification of the measuring apparatus illustrated the single capillary tube 21 may be replaced by a plurality of capillary tubes connected in series. In that case a relatively large space is provided between each of the consecutive tube sections. At the start of the test these large spaces contain reference gas. As a result of such arrangement diffusion through the connection will take place so slowly that the outer end of the connection need not be scavenged.

FIG. 6 illustrates a somewhat modified construction of the apparatus shown in FIG. 1. The two detector blocks 1 and 3 are unchanged whereas the central block 2a is modified. The two parts of the test gas chamber 6, FIG. 1, are entirely separated such that the central block has two separate scavenging spaces 6a and 6b. The scavenging spaces have inlet ducts 13a and 13b, respectively, and outlet ducts 14a and 14b, respectively. Numeral 4a denotes the test foil and numeral 5a denotes a reference foil which is made of the same material as the test foil.

The apparatus according to FIG. 6 also comprises additional members similar to those shown in FIG. 1. The mode of operation is substantially similar to that described with reference to FIG. 1 except for the following differences.

The measuring operation is started by scavenging all spaces with reference gas until balance is established in the apparatus. Then scavenging of the detector chambers is interrupted in the same manner as described above. In the scavenging space 6a associated with the test foil 4a the reference gas is replaced by test gas, whereas the other scavenging space 6b is scavenged with pure reference gas during the whole operation.

Due to the fact that the reference foil 5a is made of the same material as the test foil 4a the conditions in both detector chambers will be exactly identical. Gas which emanates from the test foil 4a, such as air in the paper layer of a laminate of a plastics and paper, and enters the test detector chamber will consequently be neutralized during the measuring operation by a corresponding emission from the reference foil 5a. Diffusion of reference gas in either direction through the reference foil will not take place. Even if the pressure conditions should result in such a diffusion the measurement result would not be affected thereby.

The embodiments described are of course primarily intended for determination of the ability of gaseous substances of diffusing through thin foils. However, especially due to the construction of the scavenging spaces 6, 6a, 6b in the central block the apparatus can be used for determination of liquids diffusing through foils while passing into gaseous state. This ability of the apparatus is especially of great value because the invention is intended to be applied i.a. in packaging research and because liquids are probably the most common group of articles for which packages of for instance plastics are more and more used. Another item that contributes to the suitability of the apparatus for measuring the diffusion of liquids is the construction of the calibrating members which make the accuracy of measurement unaffected by bulging diaphragms. Especially with liquid fluids such bulging may be considerable. While the apparatus has been described above for the purpose of measuring the permeability to gases of foil-shaped materials, it will be obvious to those skilled in the art that the invention may be equally well applied to liquids instead of gases.

What we claim is:

1. A method of determining the permeability of a material by isostatic measurement, comprising the steps of establishing a reference-detector chamber and a test-detector chamber and a test-gas chamber with the latter two chambers hermetically spaced apart by a test foil, scavenging all three chambers with a reference gas until a stable condition is obtained in the apparatus, discontinuing the scavenging of the detector chambers while scavenging said test-gas chamber with a test gas of different composition from said reference gas thereby to bring about diffusion of test gas through the test foil into the test-detector chamber and the diffusion of reference gas through the test foil into the test-gas chamber, removing the last-named reference gas from the test-gas chamber by scavenging test gas, maintaining the pressures in the test-gas chamber and reference-detector chamber constant and equal, and preventing pressure variations due to diffusion by establishing communication through a capillary between the test-detector chamber and a large gas volume external to the reference-detector chamber.

2. A method as claimed is claim 1, and scavenging said capillary connection at the outer end thereof with reference gas in a manner such that in case of a negative pressure in the detector chambers the original pressure will be reestablished by the supply of reference gas.

3. A method as claimed in claim 1, characterized in that the capillary connection consists of a plurality of conduits connected in series and that a relatively large reference gas volume is provided between each of the consecutive narrow sections.

4. A method as claimed in claim 1, characterized by scavenging with reference gas the spaces which are located outside of sealing members for sealing the detector chambers.

5. A method as claimed in claim 1, characterized by transforming the measurement result obtained into absolute values of permeability by supplying an exactly known quantity of test gas or test gas mixture of known composition into the test detector chamber so as to obtain a certain deflection of the measuring instrument which deflection is the basis of the calibration of the values obtained by the diffusion.

6. An apparatus for determining the permeability of a material by isostatic measurement comprising a test detector block, a reference detector block, a test gas chamber block provided between said first two blocks, a test detector chamber in the test detector block, a reference detector chamber in the reference detector block, a test gas chamber in the test gas chamber block, detectors in said detector chambers, a test diaphragm provided between the detector chamber and the test gas chamber, means for supplying gas to and withdrawing gas from the various chambers, and means for preventing pressure variations due to diffusion through said test diaphragm comprising a capillary connection between at least the test detector chamber and a large external gas volume.

7. An apparatus as claimed in claim 6, characterized by a calibrating member displaceable between two positions and comprising a cavity of exactly determined volume and having an opening which in one position of the calibrating member permits said cavity to be filled with test gas or a certain test gas mixture and in the other position of said member puts the interior of the cavity into communication with a detector chamber, whereby to permit gas contained in the cavity to diffuse into said chamber.

8. An apparatus as claimed in claim 6, characterized in that the test gas chamber block in addition to a test gas chamber comprises a reference gas chamber adapted to be scavenged with reference gas, and that a reference diaphragm of the same material as the test diaphragm is provided between the reference gas chamber and the reference detector chamber.

References Cited
UNITED STATES PATENTS 3,301,043    19/1967    Lyssy _____ 73—38

LOUIS R. PRINCE, *Primary Examiner.*

WM. HENRY, II, *Assistant Examiner.*